US009336261B2

(12) United States Patent
Oh et al.

(10) Patent No.: US 9,336,261 B2
(45) Date of Patent: May 10, 2016

(54) METHOD AND APPARATUS FOR UPDATING PERSONAL INFORMATION IN COMMUNICATION SYSTEM

(71) Applicant: Samsung Electronics Co. Ltd., Suwon-si, Gyeonggi-do (KR)

(72) Inventors: Gyu-Bong Oh, Suwon-si (KR); Wuk Kim, Anyang-si (KR); Kyung-Tak Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 319 days.

(21) Appl. No.: 13/957,761

(22) Filed: Aug. 2, 2013

(65) Prior Publication Data

US 2014/0040188 A1    Feb. 6, 2014

(30) Foreign Application Priority Data

Aug. 2, 2012 (KR) .......................... 10-2012-0084911

(51) Int. Cl.
| G06F 17/30 | (2006.01) |
| H04L 29/12 | (2006.01) |
| H04L 29/08 | (2006.01) |
| G06Q 10/00 | (2012.01) |

(52) U.S. Cl.
CPC .......... G06F 17/30374 (2013.01); G06Q 10/00 (2013.01); H04L 61/1594 (2013.01); H04L 67/306 (2013.01)

(58) Field of Classification Search
CPC . H04L 67/306; H04L 65/403; H04L 67/1095; H04L 29/08; G06F 17/30575; G06F 17/30374
See application file for complete search history.

(56) References Cited

U.S. PATENT DOCUMENTS

| 2010/0161807 | A1 | 6/2010 | Mostafa | |
| 2011/0145270 | A1* | 6/2011 | Christopher | ...... G06F 17/30867 707/769 |
| 2011/0320624 | A1 | 12/2011 | Schmidt et al. | |
| 2014/0082075 | A1* | 3/2014 | Fullea Carrera | ...... H04L 65/403 709/204 |

FOREIGN PATENT DOCUMENTS

| KR | 10-2011-0044250 A | 4/2011 |
| WO | 2011-108844 A2 | 9/2011 |
| WO | 2012-095518 A1 | 7/2012 |

OTHER PUBLICATIONS

Open Mobile Alliance, Converged Address Book Architecture, Candidate Version 1.0, Open Mobile Alliance OMA-AD-CAB-V1_0-20090922-C, Sep. 22, 2009.
Converged Address Book (CAB) Specification, Candidate Version 1.1, Sep. 4, 2012, pp. 1-109 OMA-TS-CAB-V1_1-20120904-C, Open Mobile Alliance Ltd.

(Continued)

*Primary Examiner* — Kim T Nguyen
(74) *Attorney, Agent, or Firm* — Jefferson IP Law, LLP

(57) ABSTRACT

A method and an apparatus for updating personal information in a communication system supporting a Converged Address Book (CAB) service are provided. The apparatus and method includes importing external personal profile information from a non-CAB system, and updating personal information in accordance with a user preference-based synchronization method using the external personal profile information.

19 Claims, 12 Drawing Sheets

(56) References Cited

OTHER PUBLICATIONS

PCC Manual Update for TS, OMA-COM-CAB-2012-0178R01-CR_CONR_PCC_Manual_Update, Aug. 8, 2012, pp. 1-23, OMA-TS-CAB-V1_1-20120802-D, Open Mobile Alliance Ltd.

PCC Manual Update for XDMS TS, OMA-COM-CAB-2012-0177R01-CR_CONR_PCC_Manual_Update_XDMS_TS, Aug. 10, 2012, pp. 1-15, OMA-TS-CAB_XDMS-V1_1-20120801-D, Open Mobile Alliance Ltd.

Chitturi et al., PCC Manual Updates TS, Change Request, OMA-COM-CAB-2012-0122R01-CR_CONR_PCC_Manual_Updates_TS, Jun. 29, 2012, pp. 1-15, Open Mobile Alliance (OMA).

Chitturi et al., PCC Manual Updates XDMS TS, Change Request, OMA-COM-CAB-2012-0121R02-CR_CONR_PCC_Manual_Updates_XDMS_TS, Jun. 29, 2012, pp. 1-14, Open Mobile Alliance (OMA).

Converged Address Book (CAB) Specification, Draft Version 1.1, Jul. 29, 2012, pp. 1-96, OMA-TS-CAB-V1_1-20120729-D, Open Mobile Alliance (OMA).

Simplified Converged Address Book Architecture, Draft Version 1.0, Jul. 24, 2012, pp. 1-54, OMA-AD-S_CAB-V1_0-20120724-D, Open Mobile Alliance (OMA).

* cited by examiner

```
<cab-feature id="abab1212">
<import-profile>
  <non-CAB-source>www.facebook.com/joeblogs/profile</non-CAB-source>
   <scheduled-interval>0</scheduled-interval>
  <credential>
   <username>joeblogs@example.com</username>
   <password>********</password>
  </credential>
  <expiration-time>3600</expiration-time>
</import-profile >
</cab-feature>
```

FIG.4

```
<document url="www.facebook.com/joeblogs/profile <http://www.facebook.com/joeblogs/profile>" new-ver="87re6q">
  <add sel="/joeblogs/profile/hobbies"><hobby>soccer</hobby>
  </add>
  <add sel="/joeblogs/profile/favorite"><favourite-song>We Are The Champion</favourite-song>
  </add>
  <remove sel="/joeblogs/profile/web-resouce"><web-entry>www.twitter.com/joeblogs</web-entry>
  </remove>
</document>
```

FIG. 5

```
<update-information-list>
    <update-information id="abab1212" pccidref="cdcd3434">
    <time-stamp>Tue, 29 Jul 2012 16:00:00 GMT</time-stamp>
    <approval-type>manual</approval-type>
    <update-type>import_profile</update-type>
  <source>facebook</source>
  <status>active</status>
    </update-information>
</update-information-list>
```

FIG.6

```
POST /org.openmobilealliance.cab-pcc/users/sip:joebloggs@example.com/index HTTP/1.1
Host xcap.example.com
...
Content-Type: multipart/mixed boundary="boundary1"
Content-Length: (...)

--boundary1

Content-Type: application/xdcp-document+xml; charset="utf-8"
Content-Length: (...)

<?xml version="1.0" encoding="UTF-8"?>
<xd:xdcp-document
    xmlns:xdcp="urn:oma:xml:xdm:xdcp-document"
    xmlns:fs="urn:ietf:params:xml:ns:simple-filter">
  <xdcp:request>
    <xdcp:diff-write>
      <fs:filter-set>
        <fs:ns-binding prefix="pcc" urn="urn:oma:xml:cab:pcc"/>
        <fs:filter id="not-approved">
          <fs:what>
            <fs:include type="xpath">
              /pcc:cab-pcc/pcc:document[@id='index']/pcc:update-information-list
                    [/pcc:update-information/@approval-type='manual']
            </fs:include>
          </fs:what>
        </fs:filter>
      </fs:filter-set>
    </xd:diff-write>
  </xdcp:request>
</xdcp:xdcp-document>

--boundary1
<?xml version="1.0" encoding="UTF-8"?>
<xd:xcap-diff xmlns:xd="urn:ietf:params:xml:ns:xcap-diff"
    xcap-root="http://xcap.example.com/root">
  <xd:document
        previous-etag="etag3"
        sel="org.openmobilealliance.cab-pcc/users/sip:joebloggs@example.com/index">
    <xd:add sel="/cab-pcc/document[@id='index']">
        <hobby-list>
            <hobby-entry>soccer</hobby-entry>
        </hobby-list>
    </xd:add>
    <xd:remove sel="/cab-pcc/document[@id='index']/web-resources/web/-entry">
        <web-resources xml:lang="en">
            <url>www.twitter.com/joeblogs</url >
        </web-resources>
    </xd:remove>
    <xd:remove sel="/cab-pcc/document[@id='index']/pcc:update-information-list
                    [/pcc:update-information/@id='abab1212']/@pccidref"
    </xd:remove>
  </xd:document>
</xd:xcap-diff>
```

FIG.7

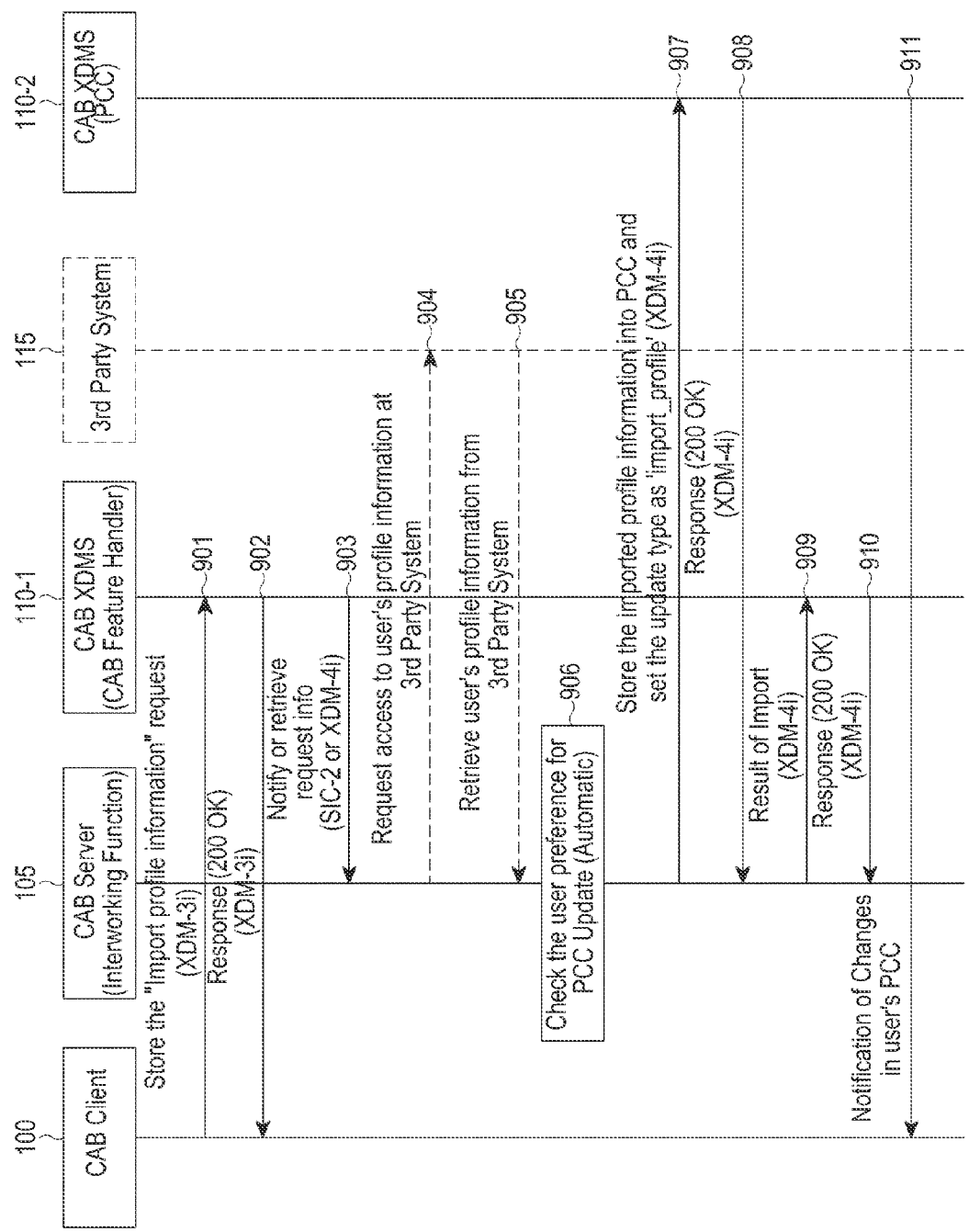

```
<update-information-list>
    <update-information id="abab1212">
      <time-stamp>Tue, 29 Jul 2012 16:00:00 GMT</time-stamp>
      <approval-type>automatic</approval-type>
      <update-type>import_profile</update-type>
   <source>facebook</source>
   <status>active</status>
    </update-information>
</update-information-list>
```

FIG.10

METHOD AND APPARATUS FOR UPDATING PERSONAL INFORMATION IN COMMUNICATION SYSTEM

CROSS-REFERENCE TO RELATED APPLICATION(S)

This application claims the benefit under 35 U.S.C. §119(a) of a Korean patent application filed on Aug. 2, 2012 in the Korean Intellectual Property Office and assigned Serial No. 10-2012-0084911, the entire disclosure of which is hereby incorporated by reference.

TECHNICAL FIELD

The present disclosure relates to a communication system. More particularly, the present disclosure relates to a method and apparatus for updating personal information in a communication system supporting a Converged Address Book (CAB) service.

BACKGROUND

A CAB service, which is a common single network-based address book service, stores a single network address book in a network and improves the user's experience and abilities for the stored single network address book. More specifically, the single network address book is provided such that it can be accessed anytime and anywhere on a variety of devices that can be manipulated by a user, and is synchronized for this purpose.

However, in a communication system supporting the CAB service, a document, in which personal information used by a CAB user is changed due to its modification, deletion, addition, and the like, may need to be updated. Accordingly, there is a need for an apparatus and method that allows the user to easily update the document.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for manually updating personal information in a Converged Address Book (CAB) system that uses personal profile information which has been imported from a non-CAB system.

Another aspect of the present disclosure is to provide a method and apparatus for automatically updating personal information in a CAB system that uses personal profile information which has been imported from a non-CAB system.

In accordance with an aspect of the present disclosure, a method for updating personal information by a CAB XML Document Management Server (XDMS) in a communication system supporting a CAB service is provided. The method includes receiving a profile import request from a CAB client, providing profile import request information to a CAB server, storing external personal profile information that the CAB server has imported from a non-CAB system as a new personal profile information document in accordance with an instruction of the CAB server, setting an update type of personal profile information as 'profile import' in the personal profile information document stored in the CAB XDMS, and setting and storing an approval type depending on a user preference checked by the CAB server.

In accordance with another aspect of the present disclosure, a method for updating personal information by a CAB server in a communication system supporting a CAB service is provided. The method includes obtaining profile request information from a CAB XDMS in response to a request of a CAB client, requesting an import of external personal profile information in a non-CAB system, importing the requested external personal profile information from the non-CAB system, checking a user preference for update of the external personal profile information, storing the imported external personal profile information in the CAB XDMS as a new personal profile information document, setting an update type of personal profile information as 'profile import' in the personal profile information document stored in the CAB XDMS, and setting and storing an approval type depending on the checked user preference.

In accordance with still another aspect of the present disclosure, an apparatus for updating personal information in a communication system supporting a CAB service is provided. The apparatus includes a Feature Handler (FH) Application Usage configured to receive a profile import request from a CAB client and to provide profile import request information to a CAB server, and a Personal Contact Card (PCC) Application Usage configured to store external personal profile information that the CAB server has imported from a non-CAB system as a new personal profile information document in accordance with an instruction of the CAB server, to set an update type of personal profile information as 'profile import' in a personal profile information document stored in the CAB XDMS, and to set and store an approval type depending on a user preference checked by the CAB server.

In accordance with yet another aspect of the present disclosure, an apparatus for updating personal information in a communication system supporting a CAB service is provided. The apparatus includes an Interworking Function (IWF) configured to obtain profile request information from a CAB XDMS in response to a request of a CAB client, request an import of external personal profile information in a non-CAB system, import the requested external personal profile information from the non-CAB system, check a user preference for update of the external personal profile information, store the imported external personal profile information in the CAB XDMS as a new personal profile information document, set an update type of personal profile information as 'profile import' in the personal profile information document stored in the CAB XDMS, and set and store an approval type depending on the checked user preference.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4 illustrates an example of a request message for importing external personal profile information in a non-CAB system in a CAB Feature Handler (FH) App. Usage according to an embodiment of the present disclosure;

FIG. 5 illustrates an example of a response message to a request message for importing an external personal profile in a non-CAB system in a CAB FH App. Usage according to an embodiment of the present disclosure;

FIG. 6 illustrates an example (manual) of a Personal Contact Card (PCC) update information list document in a CAB PCC App. Usage according to an embodiment of the present disclosure;

FIG. 7 illustrates an example of an XML Documents Manager (XDM) Document Command Protocol (XDCP) Differential Write request message, such as the message used at operation 312 of FIG. 3B, according to an embodiment of the present disclosure;

FIG. 9 is a flow diagram illustrating an automatic update method for personal information according to a second embodiment of the present disclosure; and FIG. 10 illustrates an example (automatic) of a PCC update information list document in a CAB PCC App. Usage according to an embodiment of the present disclosure.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skilled in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
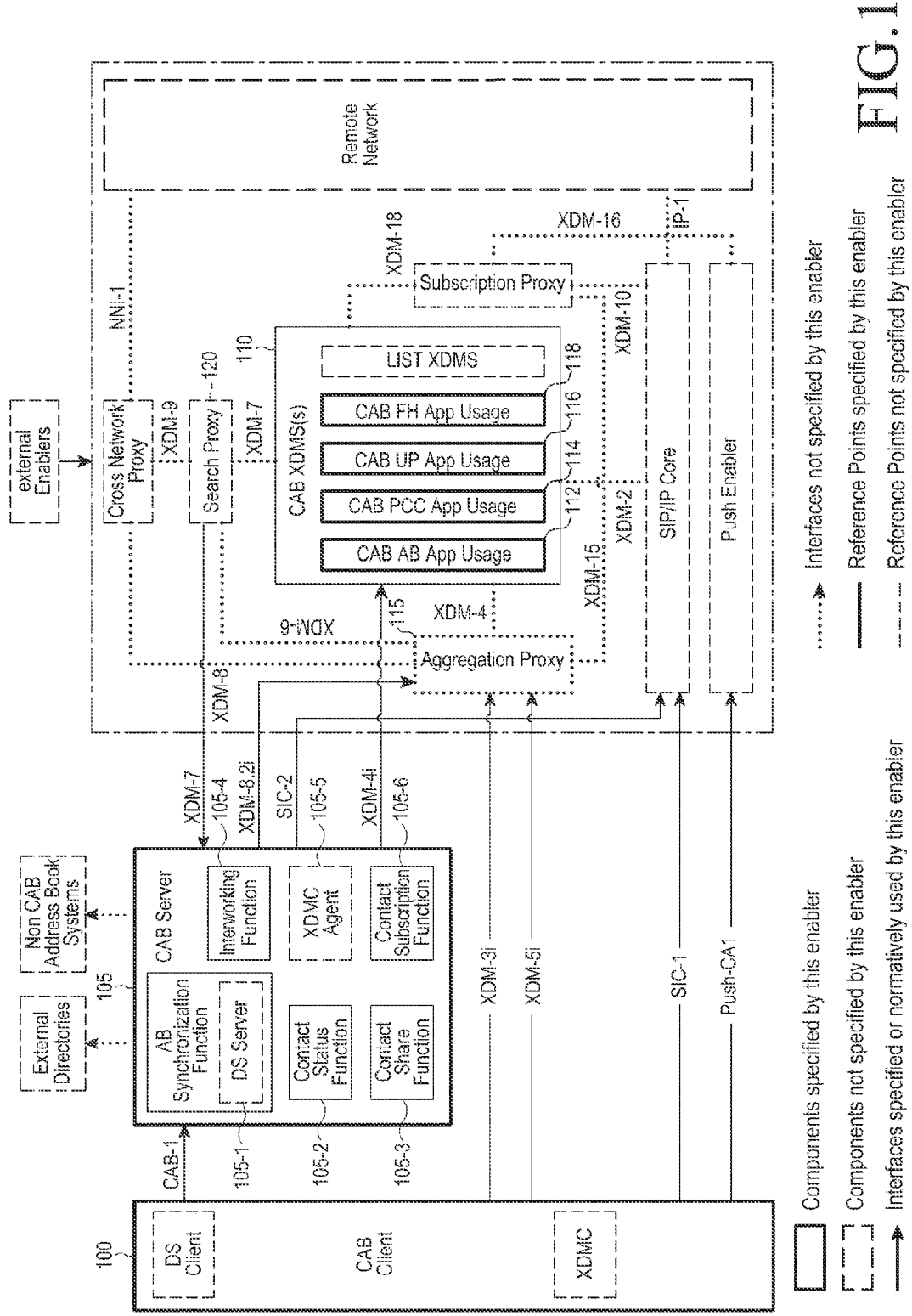
FIG. 1 illustrates a conceptual structure of a communication system supporting a Converged Address Book (CAB) service proposed by an Open Mobile Alliance (OMA) CAB group according to an embodiment of the present disclosure.

FIG. 1 illustrates a conceptual structure of a communication system supporting a Converged Address Book (CAB) service proposed by an Open Mobile Alliance (OMA) CAB group according to an embodiment of the present disclosure.

Referring to FIG. 1, the units embodied by an enabler may include a CAB client 100, a CAB server 105, and a CAB Extensible Markup Language (XML) Document Management Server (XDMS) 110. The CAB XDMS 110 is comprised of a CAB Address Book (AB) App. Usage 112, a CAB Personal Contact Card (PCC) App. Usage 114, a CAB User Preference (UP) App. Usage 116, and a CAB Feature Handler (FH) App. Usage 118.

The CAB client 100 communicates with the CAB server 105 on a terminal, and serves to authenticate a CAB user, synchronize contact information (for example, personal profile information (or PCC) with a converged address book stored in a network storage, and transmit requirements of the CAB user (for example, contact subscription, contact search, contact share, interaction with existing contacts, management of user preferences, or the like) to the CAB server 105.

The CAB server 105, a major network component in the CAB structure, serves to handle the CAB user's requirements received from the CAB client 100. The CAB server 105 serves, as one of its major features, to mutually authenticate a CAB client, store CAB contacts, synchronize contact information, receive updated contact information from a contact subscription function, and reflect it in the address book. In addition, the CAB server 105, a network component for subscribing/sharing/converting the contacts and reflecting the user's preference/policy, includes a contact subscription function of receiving information about the number of CAB user preference XML documents and CAB user's subscription request from the CAB user preference App. Usage, a contact share function of applying personal preferences of the data obtained through contact subscription, reflecting it in the address book, keeping subscription status information, and sharing the PCC or converged address book. The CAB server 105 also includes an interworking function of interworking with the existing address book system and/or exposing an interface to the external enabler. Besides, as for a CAB enabler, the App. Usage includes the CAB AB App. Usage 112 for storing the converged address book and contact status in the XML Document Management (XDM) server that manages user's data, the CAB user Pref App. Usage 116 for managing user's preference, the CAB FH App. Usage 118 for managing the CAB service request/response, and the CAB PCC App. Usage 114 for storing PCC information. In addition, there are an XDMC for accessing various App Usage functions, a Session Initiation Protocol/Internet Protocol (SIP/IP) Core Network for message routing with entities of the external domain, and a PUSH enabler for sending notification messages of non-SIP terminals.

Referring to FIG. 1, features of the common CAB service include address book synchronization, a contact subscription, contact share, contact search, and the like.

1. Address Book Synchronization

In a first operation, if a CAB user modifies a local address book stored in his/her terminal, the CAB client 100 transmits the modified information to the CAB server 105 using a CAB-1 (SyncML) interface. In a second operation, an Address Book (AB) synchronization function 105-1 provided by the CAB server 105 reflects the modifications of the local address book in the CAB AB App. Usage 112 which is a XML document management server, using an XDM agent 105-5. If the CAB client 100 is different from the CAB AB App. Usage 112 in terms of format, translation may occur, causing a possible data loss due to the translation into another format.

2. Contact Subscription

In a first operation, the CAB client 100 sends an XML Configuration Access Protocol (XCAP) request for contact subscription to the CAB User Pref App. Usage 116. In a second operation, upon receiving the XCAP request, the CAB User Pref App. Usage 116 adds a contact address obtained from the XCAP request to a contact subscription list. In a third operation, the CAB User Pref App. Usage 116 informs a contact subscription function 105-6 in the CAB server 105 of the document change in the contact subscription list due to the additional operation. In a fourth operation, the contact subscription function 105-6 may send a contact subscription request for the recipient's PCC from the contact subscription list directly to the receiving domain or through a subscription proxy. In a fifth operation, upon receiving the contact subscription request, the receiving CAB PCC App. Usage 114 checks the access permission and user preference for the contact subscription request, and informs the recipient of the subscription results. In a sixth operation, in the case of an environment where the CAP client 100 does not support SIP, the terminal and the enabler may execute the contact subscription using an XDM Document Command Protocol (XDCP).

3. Contact Share

In a first operation, the CAB client 100 sends an XCAP request for contact share to the CAB FH App. Usage 116. In a second operation, the CAB FH App. Usage 116 adds a contact address and a reference to the data to be shared, which are obtained from the XCAP request, in a CAB feature handler. In a third operation, the CAB FH App. Usage 116 informs a contact share function 105-3 in the CAB server 105 of the document change due to the addition of the contact address and the reference to the data to be shared, which are obtained from the XCAP request. In a fourth operation, the contact share function 105-3 identifies the contact status of the recipient's CAB AB App. Usage 112 based on the recipient's contact using the contact status function 105-2. As part of the fourth operation, if the recipient is a CAB user, the contact share function 105-3 generates a contact share request, and sends the contact share request to a desired target server (for example, CAB AB App. Usage 112 or CAB PCC App. Usage 114) using the XDM agent 105-5. Upon receiving the contact share request, the App. Usage sends shared data to the recipient based on the XDM forward mechanism. As another part of the fourth operation, if the recipient is not a CAB user, the contact share function 105-3 receives data from, for example, the CAB AB App. Usage 112 or the CAB PCC App. Usage 114, delivers the received data to a CAB interworking function 105-4 to request format translation into the legacy format for the data, and sends it to the recipient through a messaging enabler (not shown).

4. Contact Search

In a first operation, the CAB client 100 sends a contact search request for its own AB or PCC, or an AB or PCC of another domain through an aggregation proxy 115 or a search proxy 120 of the SDM enabler. In a second operation, the contact search request is routed to the App. Usage by the search proxy 120, and the App. Usage delivers the search results to the CAB client 100. In a third operation, during external directory search, the CAB client 100 converts the contact search request into an external search request and sends it to the external directory through the interworking function 105-4, and the external directory converts the external search results received through the interworking function 105-4 back into the standard XML search results and delivers them to the CAB client 100.

5. Import External Address Book from Non-CAB System

In a first operation, the CAB client 100 sends an XCAP request for importing non-CAB data to the CAB FH App. Usage 116. In a second operation, the CAB FH App. Usage 116 adds the information (for example, information about non-CAB source, credential, scheduled interval, expiration-time and the like) obtained from the XCAP request, in a CAB feature handler. In a third operation, the CAB FH App. Usage 116 informs the interworking function 105-4 in the CAB server 105 of the document changed due to the additional operation of the CAB feature handler. In operation 4), the interworking function 105-4 gets information about non-CAB address book data, stores it in the CAB AB App. Usage 112 depending on the CAB user preference, and then, instructs the CAB client 100 to start AB synchronization.

Figure 2:
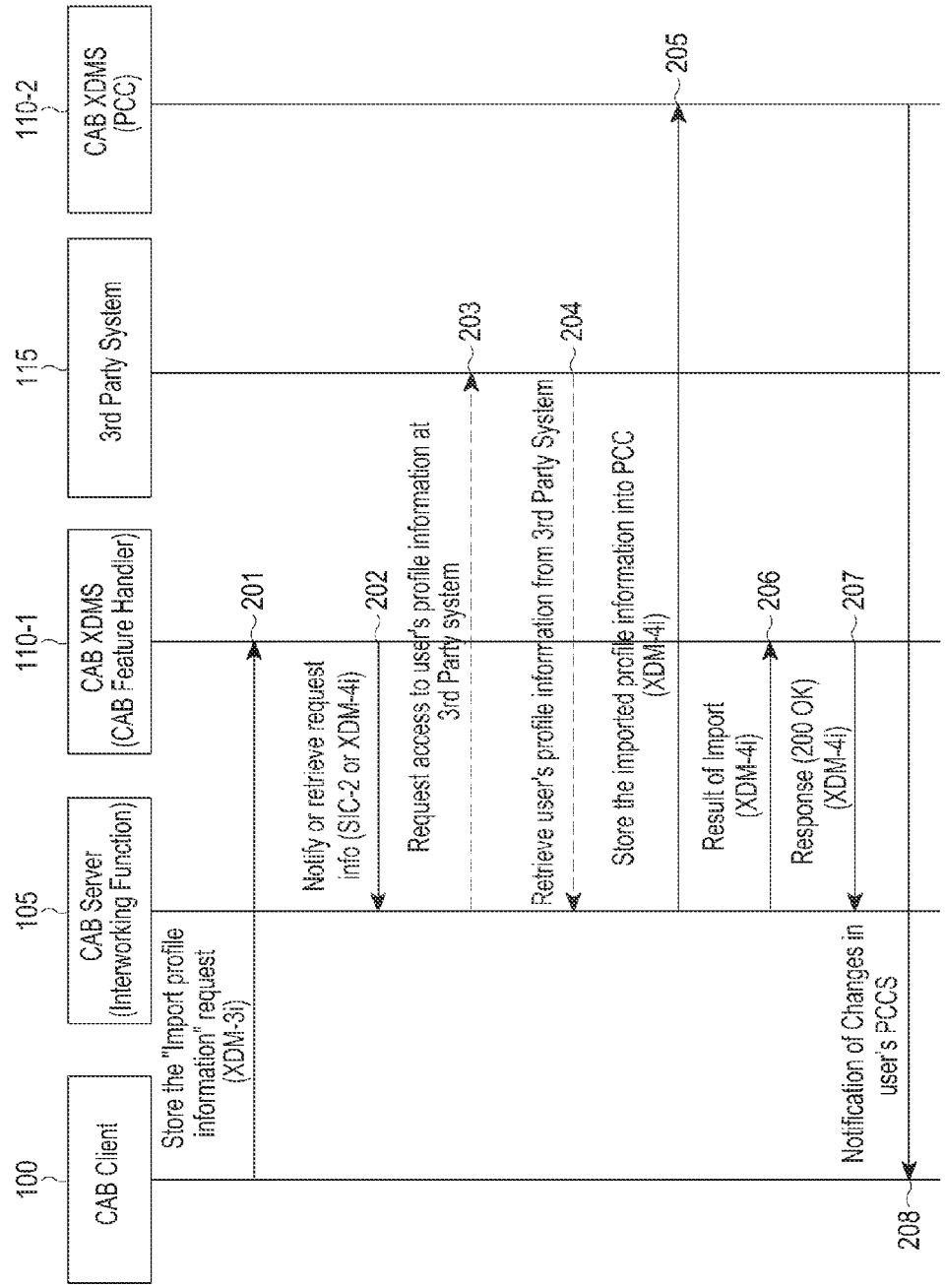
FIG. 2 is a flow diagram illustrating a method for updating personal information using an external personal profile according to an embodiment of the present disclosure.

FIG. 2 is a flow diagram illustrating a method for updating personal information using an external personal profile according to an embodiment of the present disclosure. More specifically, FIG. 2 illustrates a personal information update method through import of external personal profile information.

Referring to FIG. 2, at operation 201, the CAB client 100 stores an "import_profile" request in a CAB Feature Handler App. Usage 110-1, for importing external personal profile information from a non-CAB system (i.e., $3^{rd}$ Party System) 115. At operation 202, the CAB server 105 may obtain information about XDM document change as part of operation 201 from the CAB Feature Handler App. Usage 110-1 through document management or document subscription/notification for a predetermined period. At operation 203, an Interworking Function (IWF) in the CAB server 105 requests import of external personal profile information in the non-CAB system 115. At operation 204, the IWF in the CAB server 105 obtains external personal profile information in the non-CAB system 115. At operation 205, the IWF in the CAB server 105 changes a format of the obtained information into CAB format, and stores it in a PCC App. Usage 110-2. At operation 206, the CAB server 105 stores the results of the request in the CAB Feature Handler App. Usage 110-1. At operation 207, the CAB server 105 receives a response to the request. At operation 208, the PCC App. Usage 110-2 notifies the CAB client 100 of the updated PCC information.

However, a personal information update method through the import of external personal profile information in the non-CAB system 115 may be unsuitable as a common network personal information synchronization method as it does not provide a personal information update method through user participation/identification and does not provide a method that allows the user to be aware of the reason and/or time of the change in updated personal information.

A need for implementation of the following requirements has been raised in the background of the present disclosure. As in Table 1 below, contact subscription with the external system is managed as the requirements in the current CAB 1.1 standard.

TABLE 1

| Label | Description | Enabler Release |
|---|---|---|
| CAB-IWG-005 | The CAB Enabler SHALL allow a CAB User to request the import/export of PCC information from/to a 3rd party system. | CAB 1.1 |

In an embodiment of the present disclosure, by defining an update method for personal information in the CAB system through the import of external personal profile information in the non-CAB system 115 in order to address the above-described problems, a more efficient personal information management method may be provided to the user.

More specifically, the following methods are proposed in embodiments of the present disclosure.

There is provided a data transmission/reception method and system for providing high-speed communication services without a waste of resources, power, or memory in a communication system supporting various types of communication services.

There is provided a data transmission/reception method and system for providing a CAB service to a user in a communication system.

There is provided a data transmission/reception method and apparatus in which a fast and easy CAB service is available depending on the user's choice, by defining an update method for personal information in a CAB system through the import of external personal profile information in a non-CAB system in the CAB system.

In other words, in an embodiment of the present disclosure, if a CAB server imports external personal profile information in a non-CAB system for update of personal information in the CAB system, the CAB server may store the external personal profile information and status information imported from the non-CAB system in the PCC App. Usage separately from a PCC document, and newly define information about the status of personal information in the CAB system, to update personal information in the CAB system in accordance with a synchronization method (automatic or manual) with the non-CAB system within the user preference, thereby making it possible to provide a more efficient personal information management method to the user. In an embodiment of the present disclosure, it should be noted that the information to be subject to the import of the external personal profile information in the non-CAB system includes various types of information, such as profiles or contacts of individuals, groups, organizations, companies, and the like.

In an embodiment of the present disclosure, a detailed method related to the import of personal profile information in a non-CAB system may include a manual update method for personal information in a CAB system using personal profile information imported from the non-CAB system according to a first embodiment of the present disclosure, and an automatic update method for personal information in a CAB system using personal profile information imported from the non-CAB system according to a second embodiment of the present disclosure. The manual update method for personal information in a CAB system using personal profile information obtained from the non-CAB system according to the first embodiment of the present disclosure includes a manual update method for personal information through a personal information-updated document and a manual update method for personal information through PCC identifier (id).

Figure 3A:
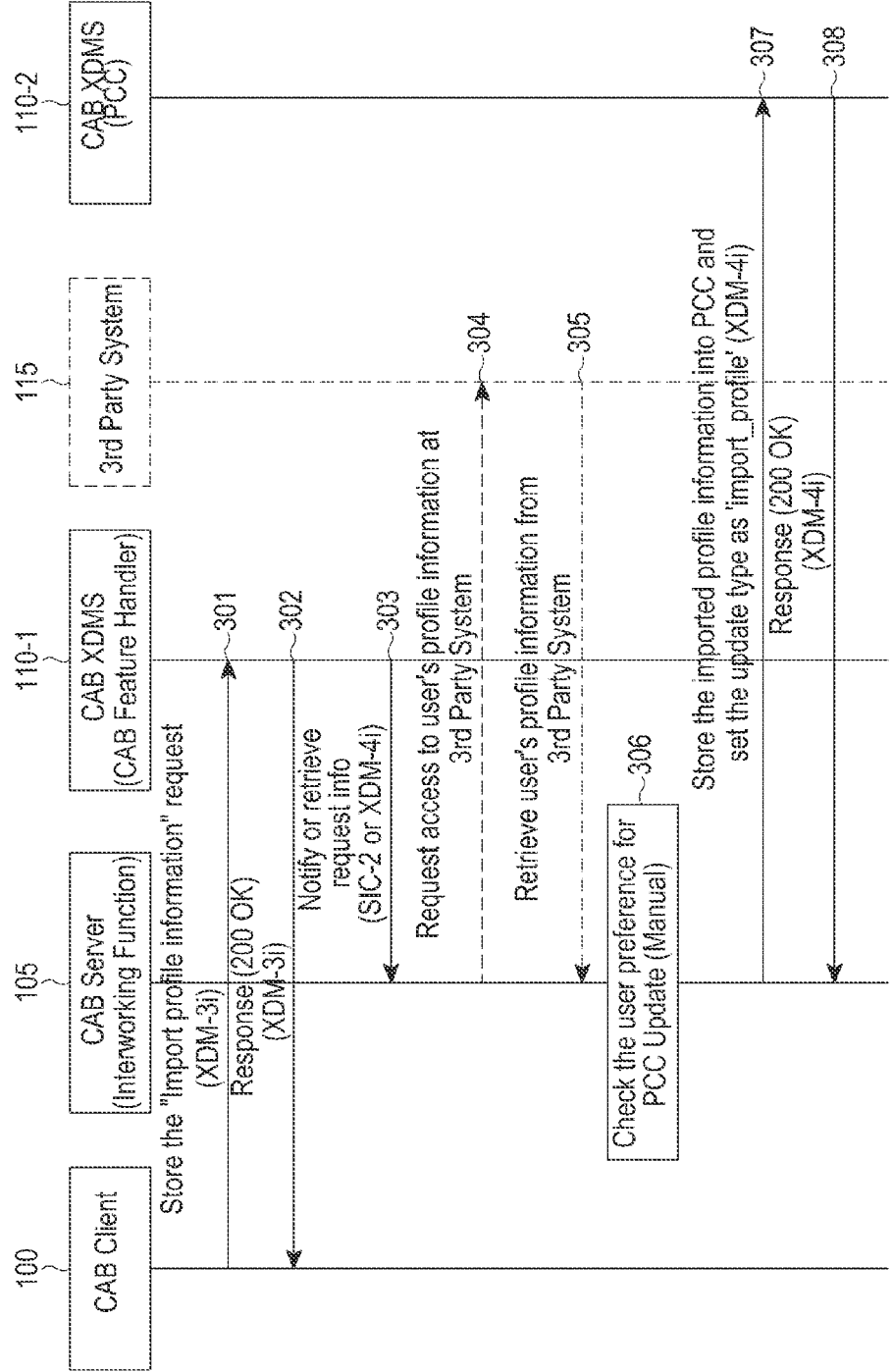
FIGS. 3A and 3B are flow diagrams illustrating an example of a manual update method for personal information according to a first embodiment of the present disclosure.
Figure 3B:
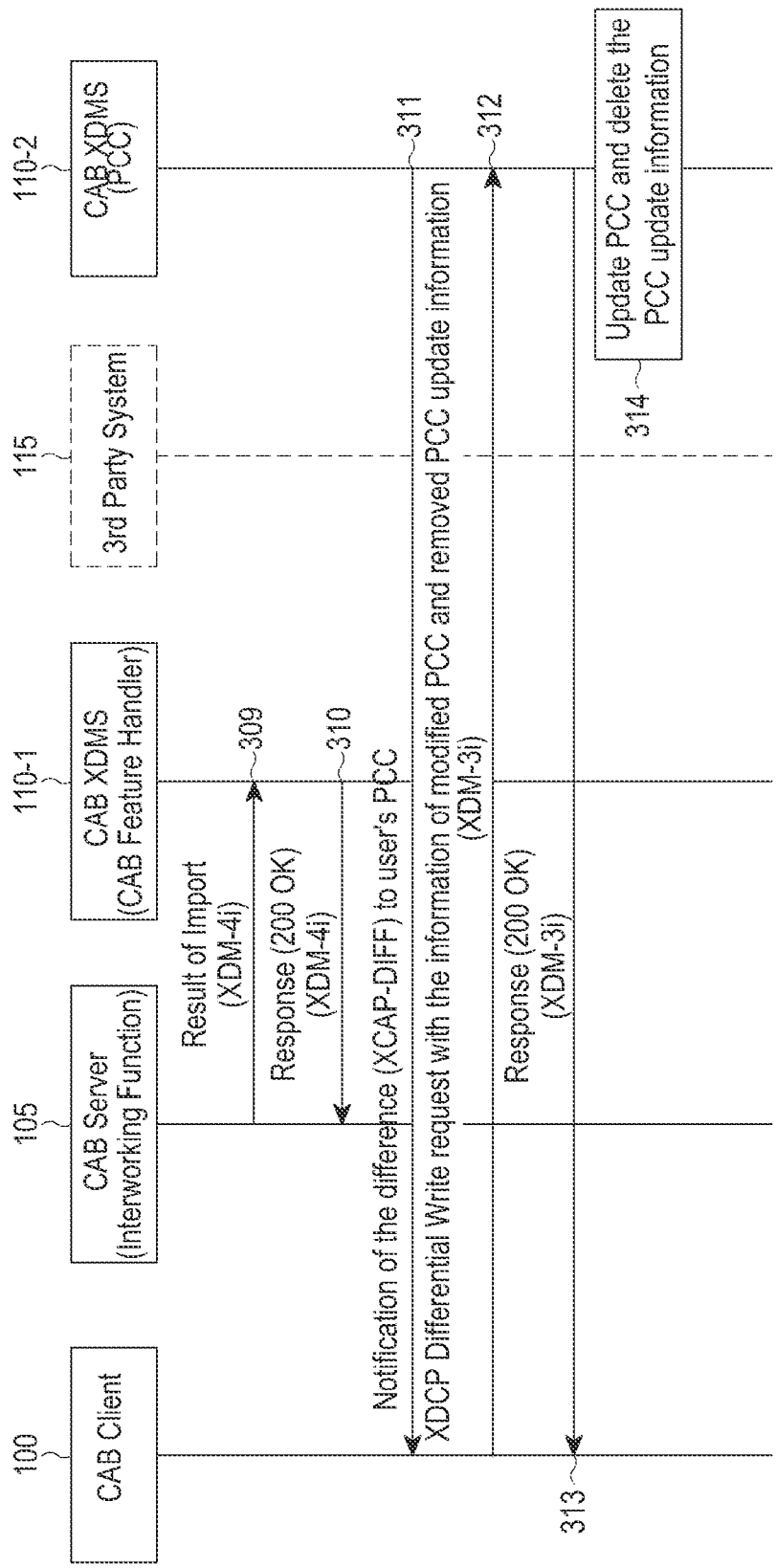

FIGS. 3A and 3B are flow diagrams illustrating an example of a manual update method for personal information according to a first embodiment of the present disclosure. More specifically, FIGS. 3A and 3B illustrate a manual update method for personal information through a personal information-updated information document in a CAB system after the import of external personal information in a non-CAB system.

Referring to FIGS. 3A and 3B, at operation 301, the CAB client 100 sends an XCAP request for the import of external personal profile information in a non-CAB system to the CAB Feature Handler App. Usage 110-1 in a CAB XDMS. The XCAP request may be represented as the schema illustrated in FIG. 4.

FIG. 4 illustrates an example of a request message for importing external personal profile information in a non-CAB system in a CAB FH App. Usage according to an embodiment of the present disclosure.

Referring to FIG. 4, the XCAP request at operation 301 indicates an <import-profile> element as an additional sub element of <cab-feature> of the CAB Feature Handler App. Usage 110-1 for the import of external personal profile information in the non-CAB system. The <import-profile> element may include <non-cab-domain>, <credential>, <scheduled-interval>, <expiration-time>, <filter> and the like as its sub elements, and additional sub elements may be created for the expansion of its related functions. The <non-cab-domain> denotes a non-CAB domain including a target Uniform Resource Identifier (URI) for the import of external personal profile information, the <scheduled-interval> denotes an import interval for the external personal profile information, the <credential> denotes a credential for the import of a user's external personal profile information, the <expiration-time> denotes a valid period of an external personal profile information import request, and the <filter> denotes a filter for selective import of external personal profile information.

Referring back to FIGS. 3A and 3B, at operation 302, the CAB client 100 receives a response message (200 OK) from the CAB Feature Handler App. Usage 110-1. At operation 303, the CAB Feature Handler App. Usage 110-1 adds a relevant element from the XCAP request in a CAB Feature Handler Document, and informs the IWF in the CAB server 105 of the document change in the CAB Feature Handler. In addition, the CAB server 105 may be informed of the document change in a CAB Feature Document through active polling for the document. At operation 304, the IWF in the CAB server 105 generates an external personal profile information import request (non-cab profile import request) message based on information in the <import-profile> element for a request message for the import of external personal profile information in a non-CAB system, which is received from the CAB Feature Handler App. Usage 110-1, sends it to the non-CAB system 115, and sets a <code> element, which is a sub element in a <response> element of the <import-profile> element in the CAB Feature Handler App. Usage 110-1, as "pending". Details about an import request for external personal profile information in a non-CAB system and its response method will not be dealt with, since they are out of the scope of the present disclosure.

At operation 305, the IWF in the CAB server 105 receives a response message to the non-cab profile import request from the non-CAB 115. The response message may be represented as the schema illustrated in FIG. 5.

FIG. 5 illustrates an example of a response message to a request message for importing an external personal profile in a non-CAB system in a CAB FH App. Usage according to an embodiment of the present disclosure.

Referring to FIG. 5, the non-CAB system sends, to the CAB system, a response message including the current version information and detailed update information of external personal profile information for the CAB user's external personal profile information import request. Details about an import request for external personal profile information in a non-CAB system and its response method will not be dealt with, since they are out of the scope of the present disclosure.

At operation 306 of FIG. 3A, the IWF in the CAB server 105 checks the user preference in the CAB User Preferences App. Usage for update of PCC information in the CAB system in the response message. The user preference defined in the CAB User Preferences App. Usage to perform operation 306 indicates whether the IWF will update personal information in the CAB system automatically or manually. If the user preference is set as 'automatic', the CAB server may directly update the PCC information using external personal profile information imported from the non-CAB system without the CAB user's check. If the user preference is set as 'manual', the CAB server may finally update the PCC information with the CAB user's check. In the first embodiment of the present disclosure, the user preference for update of personal information in the CAB system is assumed to be set as 'manual'.

At operation 307, the IWF in the CAB server 105 converts or translates a response message received from the non-CAB system 115 into a form suitable to a data format of the CAB system based on a data conversion tool such as a preset data mapping table, and then stores the existing PCC document or new PCC update document in the PCC App. Usage 110-2 in the CAB XDMS in a new PCC form. A PCC update information list document defined below may also be generated and stored in the new PCC document. The PCC update information list document in a PCC document in the PCC App. Usage may be generated separately from the existing PCC information (for example, person details, org. details, and group details). A schema of the PCC update information list document is as illustrated in FIG. 6.

FIG. 6 illustrates an example (manual) of a PCC update information list document in a CAB PCC App. Usage according to an embodiment of the present disclosure.

Referring to FIG. 6, an example of a PCC update information list document in the CAB PCC App. Usage at operation 307 may include elements <update-information>, <pccidref, <time-stamp>, <approval-type>, <update-type>, <source>, and <status> as sub elements of an element <update-information-list>, and additional sub elements may be created for the expansion of its related functions. The <update-information-list> is an element including information about a PCC update information list. The <update-information>, an element including information related to the actual PCC update information, includes an 'id' attribute for identification of the PCC update information document, and may include elements <pccidref, <time-stamp>, <approval-type>, <update-type>, <source> and <status> as its sub elements, and additional sub elements may be created for the expansion of its related functions. The <pccidref> indicates new PCC information that is generated in the existing PCC document or new PCC update document based on the external personal profile import response message generated at operation 307. If the external personal profile is automatically stored in the existing PCC document after it is converted in the form of PCC, a value of <pccidref may not be included in the PCC update information list document to prevent duplicate designation of the generated PCC information. The <time-stamp> denotes a time for which external personal profile information is imported, the <approval-type> denotes an update type of the imported external personal profile, and may include, as its sub element values, a value 'Automatic' for automatic update of personal information and a value 'Manual' for manual update of personal information. The <update-type> denotes an update type of the PCC update information document, and may include, as its sub element value, a value 'import_profile' for the import of the external personal profile information. The <source> represents a source of the imported external personal profile information, and the <status> represents a status value of an external personal profile information import request for the generated PCC personal information document, and may have 'active', 'pending', 'denied or other-error' and the like as its sub element values. In addition, in the case where PCC update information list document is added in the existing user's PCC, if PCC information converted from the external personal profile information overlaps the existing PCC, related information may be included in the PCC update information list document after its duplicate storage, and if the PCC information does not overlap the existing PCC, the converted PCC information is temporarily stored, and then a PCC update information list document may be created, in which a link therefor is included in <pccidref>.

At operation 308 of FIG. 3A, the IWF in the CAB server 105 receives a response message (200 OK) from the PCC App. Usage 110-2 in the CAB XDMS. At operation 309, the IWF in the CAB server 105 updates a <response> element in the CAB Feature Handler Document 110-1 based on the received response message. At operation 310, the IWF in the CAB server 105 receives a response message (200 OK) from the CAB Feature Handler App. Usage 110-1. At operation 311, the CAB client 100 is notified of changes in the PCC App. Usage 110-2 of the CAB user. The information that the CAB client 100 is notified of may be different depending on whether the PCC update information list document at operation 307 is generated or not. For example, depending on the import of external personal profile information in the non-CAB system, (i) the newly generated PCC information in the new PCC update document and the PCC update information list document in the user PCC document may be notified to the CAB client 100; (ii) they may be notified to the CAB client 100 in the form of the newly generated PCC information and the PCC update information list document in the existing PCC document; (iii) they may be notified in the integrated form given by adding the PCC update information list document to the existing user's PCC in the form of a sub element, i.e., notified in the form of the user's PCC information and PCC update information list document; or (iv) they may be notified to the CAB client 100 only in the form of the PCC update information list document added in the existing user's PCC document. The newly generated PCC information may be included in a PCC update information list document in the form of a reference link such as 'pccidref', as mentioned at operation 307.

At operation 312, the CAB client 100 informs the CAB user of the changes between the newly generated PCC information and the existing PCC information based on the information (for example, the newly generated PCC information in the new PCC update document and the PCC update information list document in the user PCC document; the newly generated PCC information and the PCC update information list document in the existing PCC document; the user's PCC information and the PCC update information list document in the combined form given by adding the PCC update information list document to the existing user's PCC in the form of a sub element; or the PCC update information list document added in the existing user's PCC document) notified at operation 311, allowing the CAB user to choose only his/her desired information, and sends the PCC information the CAB user desires to modify and the new PCC information document the CAB user desires to delete, to the PCC App. Usage 110-2 using a XDCP Differential Write request message. If the CAB user is notified of the existing user's PCC information including the added PCC update information list document or of only the added PCC update information list document, the CAB user checks the existing PCC information and the changes using the reference link in 'pccidref' for a check of the newly generated PCC information and may similarly choose only his/her desired information. An example of the XDCP Differential Write request message at operation 312 may be represented as illustrated in FIG. 7.

FIG. 7 illustrates an example of the XDCP Differential Write request message, such as the message used at operation 312 of FIG. 3B, according to an embodiment of the present disclosure.

Referring to FIG. 7, at operation 312, the CAB client 100 sends to the PCC App. Usage 110-2 an XDCP Differential Write request message including the PCC update information that the CAB user was notified of at operation 311, the information (for example, addition of a hobby (e.g., soccer) and deletion of web information (e.g., twitter/joeblogs)) that the CAB user has finally selected based on the existing user's PCC information, and the information for deleting the new PCC information that is stored in the existing PCC document or the new PCC update document at operation 307. Although the CAB client 100 is assumed to execute the XDCP Differential Write request to perform the operation at operation 312, the CAB client 100 may perform the operation using a command such as XCAP PUT and XDCP PUT depending on its implementation of the operation.

At operation 313 of FIG. 3B, the CAB client 100 receives a response message (200 OK) from the PCC App. Usage 110-2. At operation 314, the PCC App. Usage 110-2 updates the PCC in response to the received XDCP Differential Write request, and deletes the new PCC information that is stored in the existing PCC document or the new PCC update document at operation 307.

In addition, it can be noted in FIGS. 3A and 3B that if the CAB client 100 desires to check the results of the import of the external personal profile information in the non-CAB system, the CAB client 100 may check the results through notification of the change due to subscription to the document in the CAB Feature Handler Document, or through active polling for the document.

Next, a manual update method for personal information through a personal information identifier 'id' other than the PCC information update document will be described with reference to FIGS. 8A and 8B.

Figure 8A:
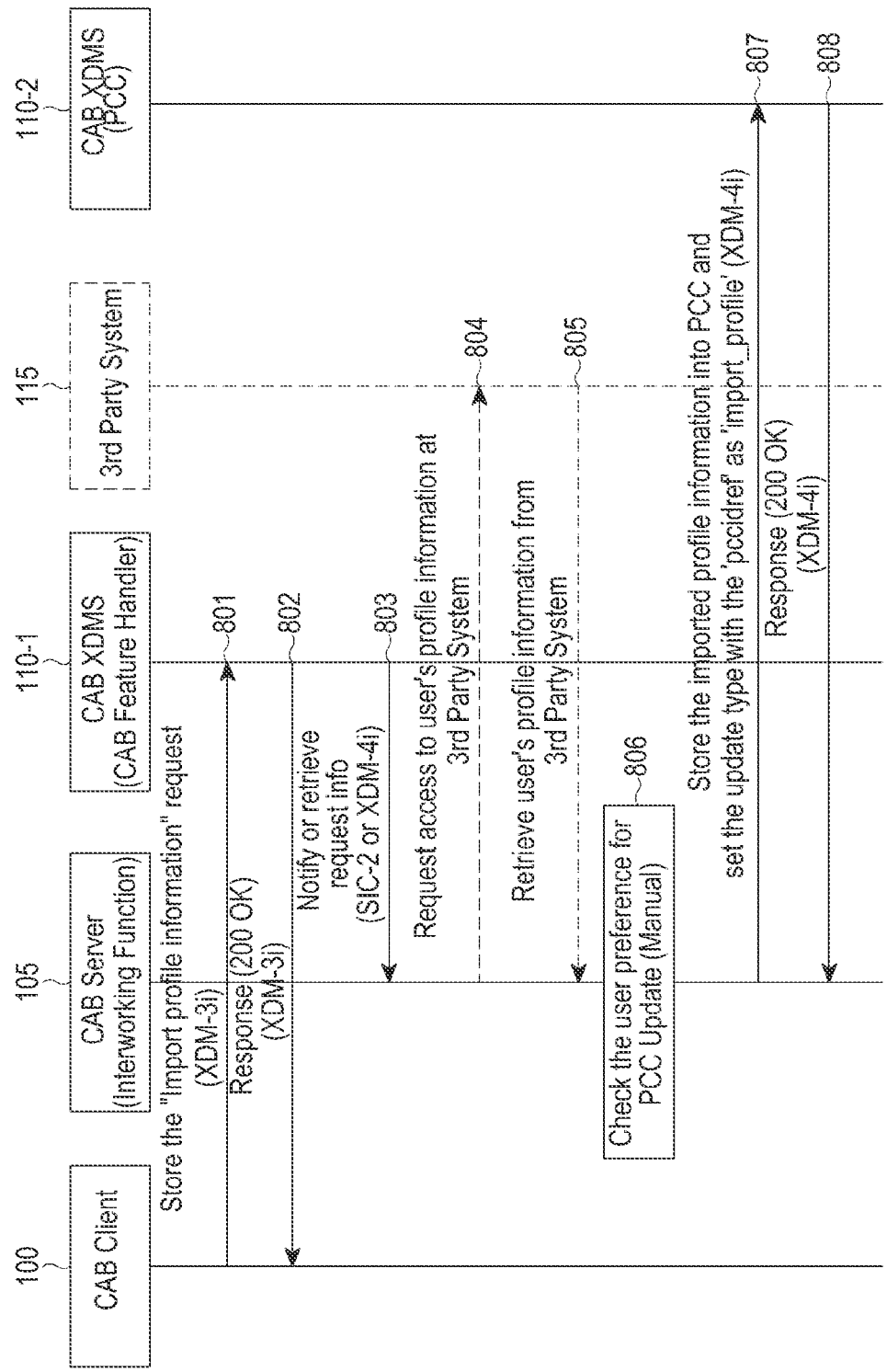
FIGS. 8A and 8B are flow diagrams illustrating another example of a manual update method for personal information according to the first embodiment of the present disclosure.
Figure 8B:
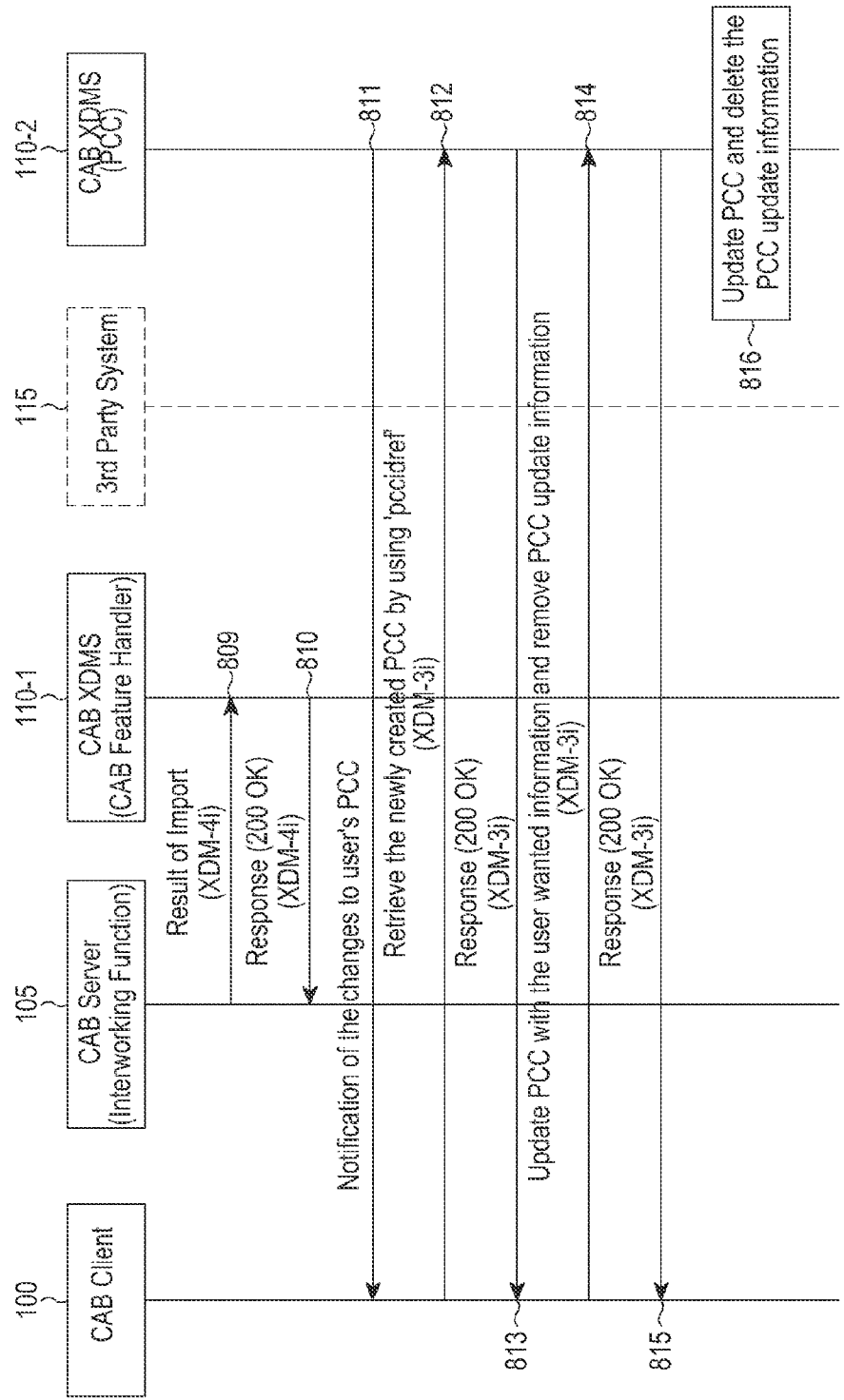

FIGS. 8A and 8B are flow diagrams illustrating another example of a manual update method for personal information, according to the first embodiment of the present disclosure. More specifically, FIGS. 8A and 8B illustrate a manual update method for personal information using a personal information identifier.

Referring to FIGS. 8A and 8B, operations 801 to 806 are substantially the same as operations 301 to 306 in FIG. 3A in terms of the operation. More specifically, at operation 801, the CAB client 100 sends an XCAP request for importing external personal profile information in the non-CAB system, to the CAB Feature Handler App. Usage 110-1 in the CAB XDMS. The XCAP request may be represented as the schema illustrated in FIG. 4.

At operation 802, the CAB client 100 receives a response message (200 OK) from the CAB Feature Handler App. Usage 110-1. At operation 803, the CAB Feature Handler App. Usage 110-1 adds a relevant element from the XCAP request in a CAB Feature Handler Document, and informs the IWF in the CAB server 105 of the document change in the CAB Feature Handler. In addition, the CAB server 105 may be informed of the document change in the CAB Feature Document through active polling for the document. At operation 804, the IWF in the CAB server 105 generates an external personal profile information request (non-cab profile import request) message based on the information in an <import-profile> element for a request message for the import of external personal profile information in the non-CAB system, which is received from the CAB Feature Handler App. Usage 110-1, sends it to the non-CAB system 115, and sets a <code> element, which is a sub element in a <response> element of an <import-profile> element in the CAB Feature Handler App. Usage 110-1, as "pending". Details about an import request for external personal profile information in a non-CAB system and a response method thereto will not be dealt with since they are out of the scope of the present disclosure.

At operation 805, the IWF in the CAB server 105 receives a response message to the non-cab profile import request from the non-CAB system 115. The response message may be represented as the schema illustrated in FIG. 5.

At operation 806, the IWF in the CAB server 105 checks the user preference in the CAB User Preferences App. Usage for update of PCC information in the CAB system in the response message. The user preference defined in the CAB User Preferences App. Usage to perform operation 806 indicates whether the IWF will update personal information in the CAB system automatically or manually. If the user preference is set as 'automatic', the CAB server may directly update PCC information using external personal profile information obtained from the non-CAB system without the CAB user's check. If the user preference is set as 'manual', the CAB server may finally update PCC information with the CAB user's check. In the first embodiment of the present disclosure, the user preference for update of personal information in the CAB system is assumed to be set as 'manual'.

At operation 807, the IWF in the CAB server 105 converts or translates an external personal profile response message received from the non-CAB system 115 into a form suitable to a data format of the CAB system based on a data conversion tool such as a preset data mapping table, and stores it in the existing PCC document or the new PCC update document in the PCC App. Usage 110-2 in the CAB XDMS in a new PCC form. The conversion results may be generated and stored in a PCC update information list document defined in FIG. 6 or the user PCC document. In other words, the PCC update information list document in a PCC document in the PCC App. Usage may be generated separately from the existing PCC information (for example, person details, org. details, and group details), making it possible for the CAB user to proceed with PCC update. Depending on the XML schema of the PCC update information list document defined in FIG. 6, relevant elements are included, and in particular, the element <pccidref> indicating the new PCC information must be included for manual update of the personal information using the personal information identifier 'id', and the element <update-type> may be set as 'import_profile'.

Operations 808 to 810 in FIGS. 8A and 8B are substantially the same as operations 308 to 310 in FIGS. 3A and 3B in terms of the operation. In other words, at operation 808, the IWF in the CAB server 105 receives a response message (200 OK) from the PCC App. Usage 110-2 in the CAB XDMS. At operation 809, the IWF in the CAB server 105 updates a <response> element in the CAB Feature Handler Document 110-1 based on the received response message. At operation 810, the IWF in the CAB server 105 receives a response message (200 OK) from the CAB Feature Handler App. Usage 110-1.

At operation 811, the CAB client 100 is notified of the changes in the PCC App. Usage 110-2 of the CAB user. The information that the CAB client 100 is notified of may be different depending on whether the PCC update information list document at operation 807 is generated or not. For example, the information notified depending on the import of external personal profile information in the non-CAB system may have the same format as the information notified at operation 311. The newly generated PCC information may be included in a PCC update information list document in the form of a reference link such as 'pccidref', as mentioned at operation 807.

At operation 812, the CAB client 100, if necessary, gets the information from the PCC App. Usage 110-2 using the reference link in the 'pccidref' attribute to check the newly generated PCC information. At operation 813, the CAB client 100 receives a response message (200 OK) from the PCC App. Usage 110-2 in the CAB XDMS. The newly generated PCC information is received in the response message at operation 807. At operation 814, the CAB client 100 informs the CAB client of the changes between the newly generated PCC information and the existing PCC information based on the information (for example, the newly generated PCC information in the new PCC update document and the PCC update information list document in the user PCC document; the newly generated PCC information and the PCC update information list document in the existing PCC document; the user's PCC information and the PCC update information list document in the combined form given by adding the PCC update information list document to the existing user's PCC in the form of a sub element; or the PCC update information list document added in the existing user's PCC document) obtained at operations 812 and 813, allowing the CAB user to choose only his/her desired information, and sends the PCC information the CAB user desires to modify and the new PCC information document the CAB user desires to delete, to the PCC App. Usage 110-2 using a XDCP Differential Write request message. An example of the XDCP Differential Write request message at operation 814 may be represented as illustrated in FIG. 7. Although the CAB client 100 is assumed to execute the XDCP Differential Write request to perform the operation at operation 814, the CAB client 100 may perform the operation using a command such as XCAP PUT and XDCP PUT depending on its implementation of the operation.

At operation 815, the CAB client 100 receives a response message (200 OK) from the PCC App. Usage 110-2. At operation 816, the PCC App. Usage 110-2 updates the PCC in response to the received XDCP Differential Write request, and deletes the new PCC information generated at operation 807.

Next, an automatic update method for personal information according to a second embodiment of the present disclosure will be described with reference to FIG. 9.

FIG. 9 is a flow diagram illustrating an automatic update method for personal information according to a second embodiment of the present disclosure.

Referring to FIG. 9, operations 901 to 905 are substantially the same as operations 301 to 305 in FIG. 3A in terms of the operation. More specifically, at operation 901, the CAB client 100 sends an XCAP request for importing external personal profile information in the non-CAB system, to the CAB Feature Handler App. Usage 110-1 in the CAB XDMS. The XCAP request may be represented as the schema illustrated in FIG. 4.

At operation 902, the CAB client 100 receives a response message (200 OK) from the CAB Feature Handler App. Usage 110-1. At operation 903, the CAB Feature Handler App. Usage 110-1 adds a relevant element from the XCAP request in a CAB Feature Handler Document, and informs the IWF in the CAB server 105 of the document change in the CAB Feature Handler. In addition, the CAB server 105 may also be informed of the document change in the CAB Feature Document through active polling for the document. At operation 904, the IWF in the CAB server 105 generates an external personal profile information request (non-cab profile import request) message based on the information in an <import-profile> element for a request message for the import of external personal profile information in the non-CAB system, which is received from the CAB Feature Handler App. Usage 110-1, sends it to the non-CAB system 115, and sets a <code> element, which is a sub element in a <response> element of an <import-profile> element in the CAB Feature Handler App. Usage 110-1, as "pending". Details about an import request for external personal profile information in a non-CAB system and a response method thereto will not be dealt with, since they are out of the scope of the present disclosure.

At operation 905, the IWF in the CAB server 105 receives a response message to the non-cab profile import request from the non-CAB system 115. The response message may be represented as the schema illustrated in FIG. 5.

At operation 906, the IWF in the CAB server 105 checks the user preference in the CAB User Preferences App. Usage for update of PCC information in the CAB system in the response message. The user preference defined in the CAB User Preferences App. Usage to perform operation 906 indicates whether the IWF will update personal information in the CAB system automatically or manually. If the user preference is set as 'automatic', the CAB server may directly update PCC information using external personal profile information imported from the non-CAB system without the CAB user's check. If the user preference is set as 'manual', the CAB server may finally update PCC information with the CAB user's check. In the second embodiment of the present disclosure, the user preference for update of personal information in the CAB system is assumed to be set as 'automatic'.

At operation 907, the IWF in the CAB server 105 converts or translates a response message received from the non-CAB system 115 into a form suitable to a data format of the CAB system based on a data conversion tool such as a preset data mapping table, and updates the existing PCC in the PCC App. Usage 110-2 in the CAB XDMS using the conversion results. A PCC update information list document defined in FIG. 10 may be generated separately from the existing PCC information (for example, person details, org. details, and group details), and the IWF in the CAB server 105 sets the element <update type> in the PCC update information list document as 'import-profile', making it possible for the CAB user to proceed with PCC update.

FIG. 10 illustrates an example (automatic) of a PCC update information list document in a CAB PCC App. Usage according to an embodiment of the present disclosure.

The schema of FIG. 10 is different from the scheme of FIG. 6 in that since new PCC information is not generated, no 'pccidref' attribute is shown, and <approval-type> is set as 'automatic'. Other elements and attributes are the same as those defined in FIG. 6.

Operations 908 to 910 are substantially the same as operations 308 to 310 in FIG. 3A in terms of the operation. In other words, at operation 908, the IWF in the CAB server 105 receives a response message (200 OK) from the PCC App. Usage 110-2 in the CAB XDMS. At operation 909, the IWF in the CAB server 105 updates a <response> element in the CAB Feature Handler Document 110-1 based on the received response message. At operation 910, the IWF in the CAB server 105 receives a response message (200 OK) from the CAB Feature Handler App. Usage 110-1.

At operation 911, the CAB client 100 is notified of the changes in the PCC App. Usage 110-2 of the CAB user. In other words, the PCC information updated by the CAB server 105 through the import of external personal profile information in the non-CAB system, and the PCC update information list document generated in the existing PCC information are notified to the CAB client 100, making it possible for the CAB user to know details that the existing PCC information has been updated through the import of external personal profile information in the non-CAB system.

As described above, by defining an update method for personal information in the CAB system through the import of external personal profile information in the non-CAB system, efficient management of personal information may be possible in the CAB system.

As is apparent from the foregoing description, by defining an update method for personal information in the CAB system through importing external personal profile information in the non-CAB system, the present disclosure may provide an efficient personal information management method to the user.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for updating personal information by a converged address book (CAB) extensible markup language (XML) document management server (XDMS) in a communication system supporting a CAB service, the method comprising:
   receiving a profile import request from a CAB client;
   providing profile import request information to a CAB server;
   storing external personal profile information that the CAB server has imported from a non-CAB system as a new personal profile information document in accordance with an instruction of the CAB server;
   setting an update type of personal profile information as 'profile import' in the new personal profile information document stored in the CAB XDMS; and
   setting and storing an approval type depending on a user preference checked by the CAB server.

2. The method of claim 1, further comprising notifying changes in the external personal profile information to the CAB client.

3. The method of claim 2, further comprising:
   if the user preference is set as 'manual', receiving, from the CAB client, modified personal profile information in which changes selected depending on a CAB user's choice are reflected among the notified changes, and
   updating only the changes selected by a CAB user in the new personal profile information document.

4. The method of claim 3, further comprising:
   receiving, from the CAB client, the modified personal profile information from which changes which are not selected by the CAB user are deleted and in which information about the deleted changes is reflected; and
   deleting the unselected changes from the new personal profile information document.

5. The method of claim 2, further comprising:
   if the user preference is set as 'manual', causing a reference link indicating a location in which the new personal profile information document is stored to be included in the new personal profile information document;
   providing newly generated personal profile information to the CAB client using the reference link;
   receiving, from the CAB client, modified personal profile information in which changes selected depending on a CAB user's choice is reflected based on the notified changes and the newly generated personal profile information imported using the reference link; and
   updating only the changes selected by a CAB user in the new personal profile information document.

6. The method of claim 2, wherein the notifying of the changes in the external personal profile information comprises notifying the changes in the external personal profile information using at least one of a session initiation protocol (SIP) message and a XDM document command protocol (XDCP) message.

7. A method for updating personal information by a converged address book (CAB) server in a communication system supporting a CAB service, the method comprising:
   obtaining profile request information from a CAB extensible markup language (XML) document management server (XDMS) in response to a request of a CAB client;
   requesting an import of external personal profile information in a non-CAB system;
   importing the requested external personal profile information from the non-CAB system;
   checking a user preference for update of the external personal profile information;
   storing the imported external personal profile information in the CAB XDMS as a new personal profile information document;
   setting an update type of personal profile information as 'profile import' in the new personal profile information document stored in the CAB XDMS; and
   setting and storing an approval type depending on the checked user preference.

8. The method of claim 7, further comprising receiving by the CAB client a notification of changes in the external personal profile information from the CAB XDMS.

9. The method of claim 8, further comprising:
   if the user preference is set as 'manual', transmitting by the CAB client, to the CAB XDMS, modified personal profile information in which changes selected depending on a CAB user's choice are reflected among the notified changes to allow the CAB XDMS to update only the changes selected by a CAB user in the new personal profile information document.

10. The method of claim 9, wherein the CAB client deletes changes which are not selected by the CAB user, reflects information about the detected changes in the modified personal profile information, and transmits the modified personal profile information.

11. The method of claim 8, further comprising:
    if the user preference is set as 'manual', causing a reference link indicating a location in which the new personal profile information document is stored to be included in the new personal profile information document;
    importing, by the CAB client, newly generated personal profile information from the CAB XDMS using the reference link; and
    transmitting, to the CAB XDMS, modified personal profile information in which changes selected depending on a CAB user's choice are reflected based on the notified changes and the newly generated personal profile information obtained using the reference link to allow the CAB XDMS to update only the changes selected by a CAB user in the new personal profile information document.

12. The method of claim 8, wherein the receiving of the changes in the external personal profile information comprises receiving a notification of the changes in the external personal profile information using at least one of a session initiation protocol (SIP) message and a XDM document command protocol (XCDP) message.

13. An apparatus for updating personal information in a communication system supporting a converged address book (CAB) service, the apparatus comprising:
- a feature handler (FH) application usage unit configured to:
  - receive a profile import request from a CAB client, and
  - provide profile import request information to a CAB server; and
- a personal contact card (PCC) application usage unit configured to:
  - store external personal profile information that the CAB server has imported from a non-CAB system as a new personal profile information document in accordance with an instruction of the CAB server,
  - set an update type of personal profile information as 'profile import' in the stored new personal profile information document, and
  - set and store an approval type depending on a user preference checked at the CAB server.

14. The apparatus of claim 13, wherein the FH application usage unit is further configured to notify the CAB client of changes in the external personal profile information.

15. The apparatus of claim 14, wherein if the user preference is set as 'manual', the PCC application usage unit is further configured to:
- receive, from the CAB client, modified personal profile information in which changes selected depending on a CAB user's choice are reflected among the notified changes, and
- update only the changes selected by a CAB user in the new personal profile information document.

16. The apparatus of claim 15, wherein the PCC application usage unit is further configured to:
- receive from the CAB client the modified personal profile information from which changes which are not selected by the CAB user are deleted and in which information about the deleted changes is reflected, and
- delete the unselected changes from the new personal profile information document.

17. The apparatus of claim 14, wherein if the user preference is set as 'manual', a reference link indicating a location, in which the new personal profile information document is stored is included in the new personal profile information document;
wherein the PCC application usage unit is further configured to:
- provide newly generated personal profile information to the CAB client using the reference link,
- receive, from the CAB client, modified personal profile information in which changes selected depending on a CAB user's choice is reflected based on the notified changes and the newly generated personal profile information obtained using the reference link, and
- update only the changes selected by a CAB user in the new personal profile information document.

18. The apparatus of claim 14, wherein the PCC application usage unit is further configured to notify the changes using at least one of a session initiation protocol (SIP) message and a XDM document command protocol (XDCP) message.

19. An apparatus for updating personal information in a communication system supporting a converged address book (CAB) service, the apparatus comprising:
an interworking function (IF) unit configured to:
- obtain profile request information from a CAB extensible markup language (XML) document management server (XDMS) in response to a request of a CAB client,
- request an import of external personal profile information in a non-CAB system,
- import the requested external personal profile information from the non-CAB system,
- check a user preference for update of the external personal profile information,
- set an update type of personal profile information as 'profile import' in a new personal profile information document stored in the CAB XDMS, and
- set and store an approval type depending on the checked user preference; and
a personal contact card (PCC) application usage unit configured to:
- store the imported external personal profile information in the CAB XDMS as the new personal profile information document.

* * * * *